Sept. 24, 1940. E. E. GREGORY ET AL Re. 21,579
ELECTROMOTOR
Original Filed July 1, 1930 2 Sheets-Sheet 1
Fig. 1,
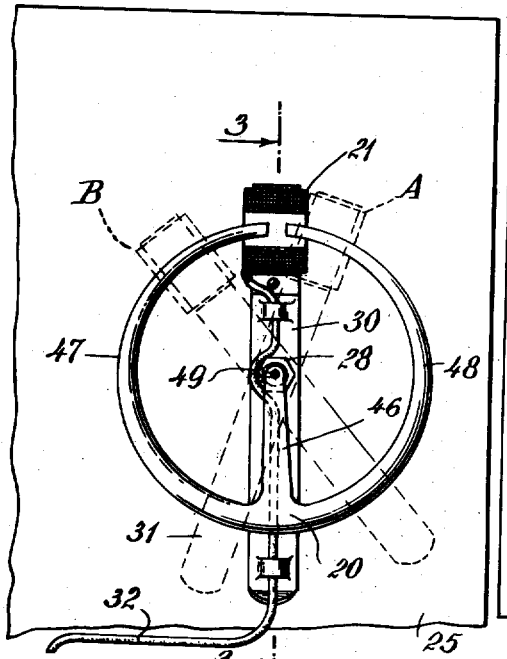
Fig. 2
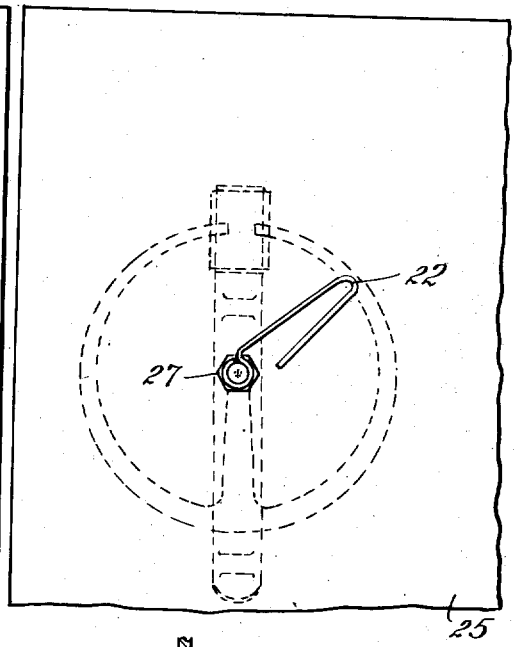
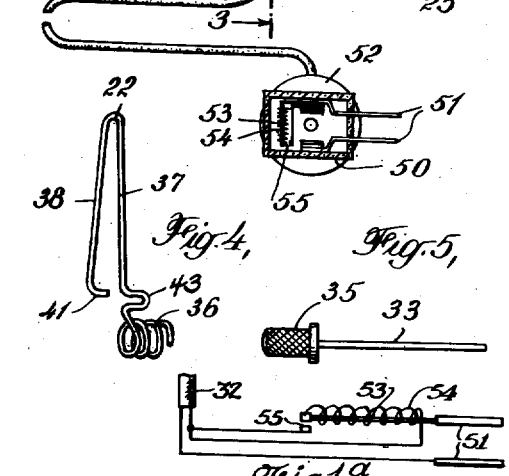
Fig. 4, Fig. 5, Fig 1a
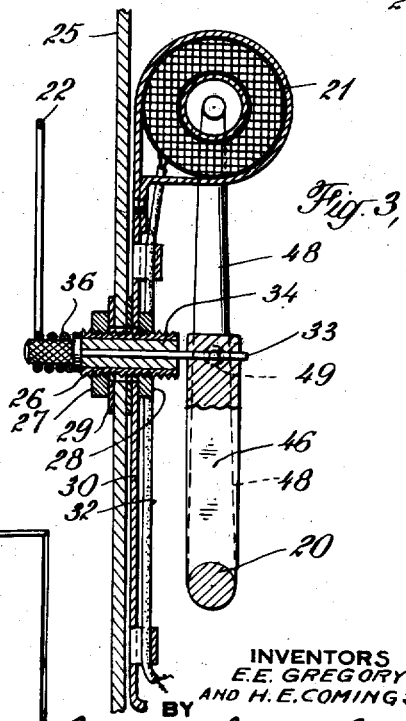
Fig. 3,
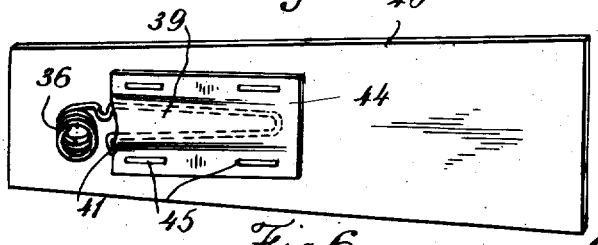
Fig. 6.
INVENTORS
E. E. GREGORY
AND H. E. COMINGS.
BY
Bonnie, Davis, Marvin & Edwards
THEIR ATTORNEYS ELECTROMOTOR
Original Filed July 1, 1930 2 Sheets-Sheet 2
Fig. 7,
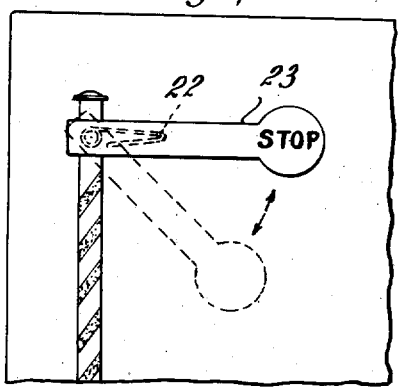
Fig. 8
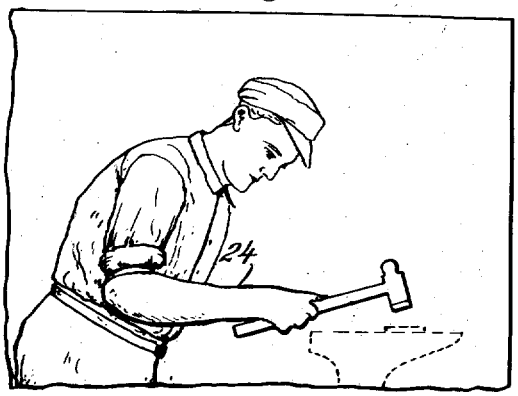
Fig. 9,
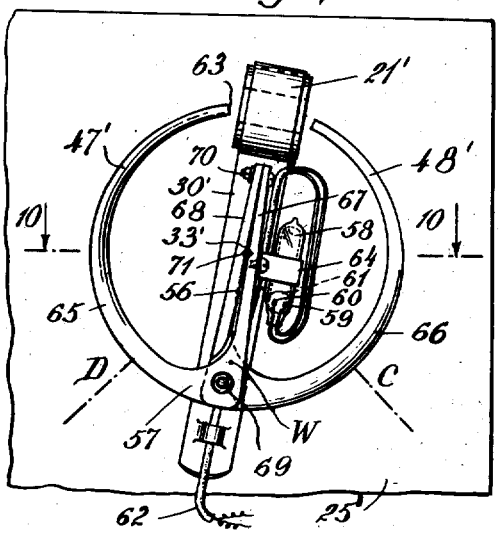
Fig. 11,
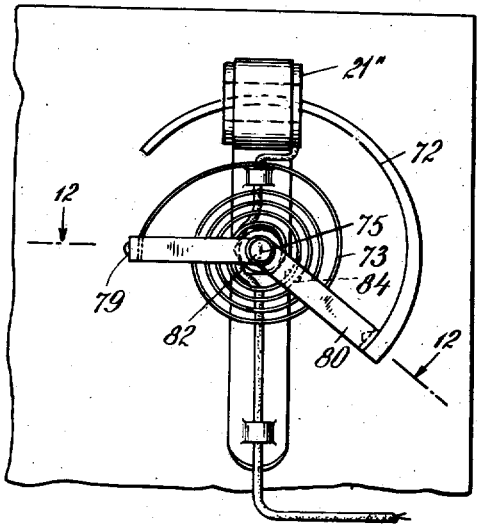
Fig. 10,
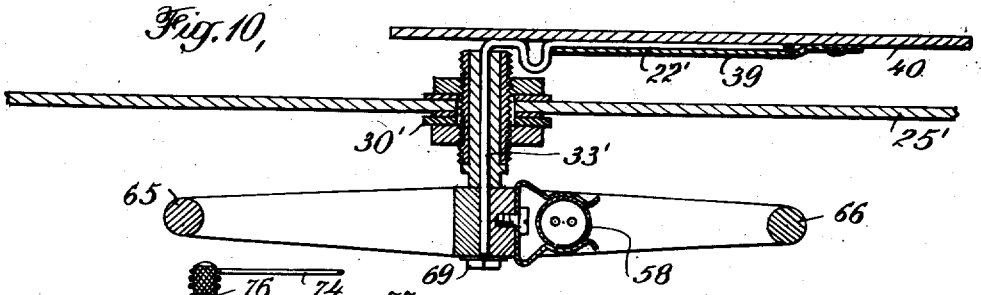
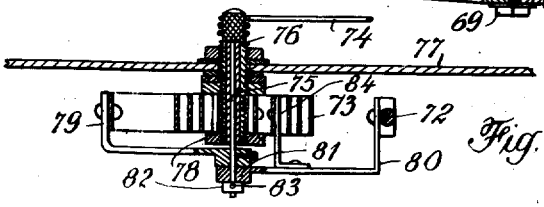
Fig. 12.
INVENTORS
E. E. GREGORY
AND H. E. COMINGS,
BY
Pennie, Davis, Marvin & Edmonds
THEIR ATTORNEYS Reissued Sept. 24, 1940

Re. 21,579

UNITED STATES PATENT OFFICE 21,579

ELECTROMOTOR

Eli E. Gregory, Stirling, N. J., and Henry Emerson Comings, Manhasset, N. Y.; said Comings assignor to said Gregory Original No. 1,893,025, dated January 3, 1933, Serial No. 465,150, July 1, 1930. Application for reissue August 17, 1939, Serial No. 290,710

14 Claims. (Cl. 46—51)

This invention relates to electromotors of the kind adapted to produce an oscillating motion. The invention aims to provide an electromotor of improved construction which in its main features is adaptable for technical or industrial use such for example as the operation of signals and relays.

One of the important uses for such motors, however, is in actuating changeable exhibitors or animated advertising devices, and the invention will therefore be described particularly as applied to the operation of such devices. As to its details, moreover, the invention is directed to the adaptation of our improved electromotor to this use.

Animated advertising devices, such for example as display posters, are employed quite widely in window advertising where the impartation of motion to one or more of the elements making up the scene on the poster attracts attention to the poster and the entire window. The display poster presents to the advertiser an almost limitless number of possibilities for arranging scenes of which the advertising value can be greatly increased by imparting an oscillating motion to one of their elements. Although a number of elements of the scene on the poster may be animated if desired, it is usually sufficient to animate a single one.

Accordingly the objects of our invention are,

First, to provide an electromotor which is simple in construction, has few parts, and which has substantially the irreducible minimum of rubbing or wearing parts which are so constructed as to require no oiling and which will therefore operate for indefinite periods without attention.

Second, to provide an electromotor which is adapted particularly for actuating animated advertising devices which is so constructed that it can be readily dismantled from one advertising device and applied to another by persons which are not proficient in mechanical skill. This makes our improved electromotor extremely practicable inasmuch as the advertiser can himself readily remove the electromotor from an advertising device which he desires to discard and apply it to a new device.

Third, to provide an electromotor for actuating advertising devices which is capable of producing an extremely long oscillating stroke but which is also readily adjustable to vary the length of the stroke, and also to a certain extent to vary the kind or type of motion produced.

Fourth, to adapt an electromotor to the actuation of advertising devices in such a way that the element of the scene which is to be actuated by the device can be readily adjusted both angularly and radially to suit the other parts of the scene, and also readily attached to or removed from the electromotor.

The invention will be better understood by a consideration of the accompanying drawings and the following detailed description thereof which relates to several embodiments of the invention.

In these drawings:

Fig. 1 is a view of our electromotor in elevation looking at the rear of an advertising poster on which it is mounted.

Fig. 1*a* is a diagram showing the circuit connections of Fig. 1.

Fig. 2 is a similar view looking at the front of the poster and showing the arm for supporting the element of the scene on the poster which is to be moved by the electromotor.

Fig. 3 is a vertical section taken on line 3—3 of Fig. 1.

Fig. 4 is a perspective view showing the supporting arm in detail.

Fig. 5 is a side view of the shaft of the motor.

Fig. 6 is a perspective view showing the manner in which a moving element of the scene, a semaphore for example, is attached to the supporting arm of Fig. 4.

Fig. 7 is a front view of a fragment of a poster showing a slightly different form of semaphore actuated by the electromotor.

Fig. 8 is a similar view of a fragment of a different poster.

Fig. 9 is a view similar to Fig. 1 of a modified form of electromotor.

Fig. 10 is a horizontal section taken on line 10—10 of Fig. 9.

Fig. 11 is a view also similar to Fig. 1 of a still further modified form of electromotor, and Fig. 12 is a section taken on line 12—12 of Fig. 11.

Referring now to the accompanying drawings, our improved electromotor comprises an oscillator 20 adapted to be set in oscillating motion by means of a solenoid or electromagnetic coil 21 in a manner to be presently described, and to impart this motion to the supporting arm 22 which may carry for example the semaphore 23 which is an element of the poster shown in Fig. 7, or the movable arm 24 of the blacksmith and anvil poster shown in Fig. 8.

The various parts of the mechanism of the electromotor are supported upon the sheet 25 of cardboard or other material comprising the poster by means of a threaded sleeve 26 which passes through an aperture in the poster and which is provided with outer and inner clamping nuts 27 and 28 respectively. A washer 29 may be placed under the outer nut 27 is desired.

The solenoid 21 is appropriately mounted upon the upper end of an arm 30 which extends radially from sleeve 26 and is frictionally held in position by means of inner nut 28, the arm 30 being apertured for the passage of sleeve 26. Arm 30 is preferably provided with an extension 31 projecting downwardly beyond the periphery of the oscillator 20 to partially counterbalance the weight of the coil 21 and to provide a convenient means of adjusting the angular position of solenoid 21, which will be referred to later on. It also affords a convenient support for the electrical conductors 32 by means of which current is supplied to the solenoid 21.

The electromotor shaft 33 is rotatably carried in a bushing 34 which is frictionally retained in sleeve 26. By making shaft 33 of extremely hard and highly polished material, such for example as piano wire, and employing a bushing 34 of oiled wood or fibre, or the like, a bearing is provided which will operate noiselessly and without lubrication for months before sufficient wear takes place to necessitate replacement of either the bushing or the shaft.

The outer end of shaft 33 is provided with an enlarged head 35 which is preferably knurled and over which the hub of the supporting arm 22 fits, the friction between these two parts being sufficient to maintain the arm in the desired angular position and at the same time allow it to be rotated to the position desired to suit the particular scene on the poster. Although various forms of arms 22 may be used, that shown in the drawings is particularly convenient because it is light in weight, cheap, easily and effectively attached to the head 35, and provides for the ready attachment and removal of the movable element of the scene.

This particular form of supporting arm 22 which we have devised is made entirely of resilient wire. The arm has two spring sections 37 and 38 formed by bending the wire upon itself at the outer end of the arm. This produces a smooth rounding point which will not catch or mar anything with which it comes in contact. Moreover, the arms 37 and 38 which spring outwardly away from each other are readily adapted to be received within a pocket 39 which is attached to the rear side of the element which it is desired to attach to the arm, such element being the ordinary semaphore 40 shown in Fig. 6 for the arms 23 and 24 of Figs. 7 and 9 respectively.

Sections 37 and 38 lie in a plane parallel to the surface of the poster and at right angles to shaft 33. The outer end of section 38 is bent parallel with the hub 36 as indicated at 41 so as to engage the inner edge 42 of pocket 39 and thus prevent this edge from coming in contact with the hub or interfering with the oscillation. For the same purpose the wire forming the arm, as it leaves the hub portion 36 is bent into a hump 43, shown in Fig. 4. Pocket 39 may conveniently be made by stapling or otherwise securing a piece of pasteboard or cloth 44 to the rear surface of the semaphore, the stapling being located at the sides of the strip as indicated at 45.

The oscillator 20 has a single radial arm 46 and a pair of curved armature portions 47 and 48. Each of these extends in semi-circular form from the outer or lower end of the radial arm 46. The upper ends of the armature portion do not quite meet, thus leaving a short gap between them. At its inner end the radial arm 46 is fixed to shaft 33, as, for example, by means of a screw 49, so that the oscillator drives or turns the shaft together with supporting arm 22, and whatever device is mounted upon it.

Solenoid 21 consists of a coil of a large number of turns of fine wire which has sufficient resistance to be operated from the mains of the ordinary lighting circuit without overheating and without drawing more than a fraction of an ampere of current from the main. In the form of the invention shown in Figs. 1, 2 and 3, the circuit through the solenoid 21 is opened and closed by external means such for example as a thermostatically controlled switch, a circuit interrupter operated by clock work, or any convenient form of switch which is adapted to open and close the circuit periodically.

In the accompanying drawings a thermostatically actuated switch 50 is shown. This switch is provided with prong contacts 51 which are adapted to be inserted in the usual electrical outlet or connector. A connection plug 52 which is attached to the end of the conductors 32 is similarly connected to the side of the thermostatic switch 50. Switch 50 contains a bi-metallic thermostatic strip 53 (see connection diagram shown in Fig. 1*a*), which, when heated by a small coil 54 surrounding it causes contacts 55 to close thereby short-circuiting coil 54. Hence when the strip 53 cools off due to the cessation of current through coil 54, contacts 55 again open. It will be understood that contacts 55 are in series with the circuit through one of the contact prongs 51 and solenoid 21 and thereby cause an intermittent variation in the current through the solenoid. This variation amounts to a periodic cut-off of the current through the solenoid since the resistance of heating coil 54 is so high that the amount of current which passes when it is in circuit is negligible.

When it is desired to place the electromotor in operation, the solenoid 21 is shifted to one side or the other of the full line position shown in Fig. 1 by means of the extension or handle 31. Dotted position A, for example, indicates one operative position to the right of the centre line, and dotted position B indicates another operative position to the left of the centre line. These positions, however, are only illustrative, and solenoid 21 may be placed in almost any desired position from a point just off of the centre line at the top to a point a few degrees from the centre line at the bottom, depending upon the length of swing or oscillation and the character of movement desired. Such shifting of the solenoid 21 to the right or to the left, in addition to varying the length of swing and character of movement, also compensates for the displacement of the oscillator to the right or left of a central position caused by the weight of the semaphore 23 or movable arm 24.

It is well understood that when a movable magnetizable core is so mounted that it is free to be drawn into a coil through which a current of electricity is passing that the core will advance until the magnetic centre thereof coincides with the magnetic centre of the coil. Assuming that solenoid 21 is in the dotted position A and that a current is established through the coil by means of the thermostatic switch 50, armature 48 will commence to move into the solenoid until the magnetic centre of armatures 48 and 47, which is at the bottom of the oscillator immediately opposite the end of radial arm 46 is as close as possible to the centre of solenoid 21. The result is that arm 46 is raised to the right in Fig. 1 until it strikes or approaches very close to the solenoid. Then if the current through the coil is interrupted by switch 50, the weight of arm 46 which is sufficient to overbalance the weight of the supporting arm 22 and the semaphore carried thereby, will cause the oscillator 20 to swing in the opposite direction, with the result that the desired oscillation is imparted to the oscillator.

If the period of the opening and closing of contacts 55 of the thermostatic switch is the same as the natural period of oscillation of oscillator 20, the oscillator will operate at maximum swing or amplitude. By choosing a thermostatic switch having a period of operation different from the natural period of the oscillator, a compound movement of the oscillator is thereby produced, and some very interesting motions of the semaphore 23 or arm 24 are effected, which are appropriate to the particular scene on the poster.

It will be observed that the armature portions 47 and 48 of the oscillator are not of uniform cross-section but that the cross-sectional area of these armatures increases towards the bottom. We have found that by constructing the armatures in this manner so that their cross-sectional areas increase as they are drawn farther and farther into the solenoid, that the torque is rendered very much more uniform than when the armature portions are of constant cross-sectional area. Preferably the magnetizing force of the coil 21 is made so large with respect to the cross-sectional area of the upper ends of the armatures 47 and 48 that these are saturated.

The general construction of the modified form of electromotor shown in Figs. 9 and 10 is about the same as that previously described. The differences lie in the fact that the switch for controlling the circuit of the solenoid is actuated by the movement of the oscillator, and the oscillator itself is of a particular construction.

The solenoid 21' is mounted as before upon an adjustable arm 30' which is supported upon the poster sheet 25' in the same manner as previously described in connection with arm 30. Mounted upon the radial arm 56 of the oscillator 57 is a mercury switch 58 which consists of a glass envelope into the bottom of which two electrodes 59 and 60 are sealed, these electrodes being electrically connected by a drop of mercury 61 in certain angular positions of the switch.

Current is supplied to the device through the cable 62, one conductor of which leads directly to solenoid 21', and the other conductor of which leads to one of the electrodes of the mercury switch 58. The other electrode is connected with coil 21' so that switch 58 is connected in series with this coil.

In Fig. 9 the coil 21' has been shifted off center to one of its operative positions. If cable 62 is connected to a source of current, armature 48' will be drawn into the solenoid. The torque produced by coil 21' is ordinarily sufficient to draw the armature only part way into the solenoid, and not sufficient to overcome the overbalanced weight of the oscillator 57, the center of which is approximately at the point W near the bottom of the oscillator. If the oscillator is set in motion by rotating the point W to either the left or the right up to a position near coil 21', the torque is sufficient to maintain the device oscillating at full swing or amplitude.

The mercy switch 58 is so constructed that the contacts 59 and 60 are closed by the mercury while the centre of weight W swings between a predetermined angle on each side of the vertical centre line of motion. Thus, for example, assuming that the centre of weight W is at the top of its stroke adjacent the right hand side of coil 21', the oscillator rotates by gravity as the point W descends to about the point C, when the mercury switch closes. The inertia of the oscillator and parts moving therewith, however, is sufficient to overcome the opposing torque of coil 21' and the clockwise rotation of the oscillator continues until the upper end 63 of armature 47' comes within the influence of coil 21'. The torque produced by the coil from that point on aids in maintaining the clockwise rotation of the oscillator and imparts sufficient additional energy to the same to carry the centre of weight W up to a position close to the left hand side of coil 21', the current through the solenoid however being cut off by switch 58 when the point W passes approximately the point D on the upward stroke.

A repetition of the events just described now takes place while the oscillator rotates in the opposite or counter-clockwise direction to the position at which it started at the right hand side of coil 21'. This completes a full cycle of operation.

The mercury switch 58 is a convenient form of switch to use since it may be easily attached to the oscillator by means of the clip 64. Moreover, it is inexpensive and as its only moving part is the drop of mercury 61, there is nothing about the switch to get out of order. It will be understood however, that a mechanical switch or any other convenient form of switch adapted to open and close the circuit through the solenoid 21' during the oscillation of oscillator 57 may be used in place of the mercury switch.

The points C and D at which the circuit is opened and closed by switch 58 may be shifted either up or down but their exact location is not important.

The structure of oscillator 57 used in the form of our electromotor shown in Figs. 9 and 10, is such as to provide for quick and easy assembly of the electromotor. The oscillator consists of two parts 65 and 66. Each of these parts is exactly alike and is of equal weight. Part 65 comprises armature 47' and radial bar 67 which extends from the lower end of armature 47' toward the upper end. Part 66 consists of armature 48' and a similar radial bar 68. The two parts 65 and 66 are pivoted together by means of a small bolt or rivet 69, the bars 67 and 68 crossing one another so that movement of the armatures 47' and 48' toward one another will tend to separate bars 67 and 68.

Bars 67 and 68 constitute the radial arm 56 and are firmly secured together at their upper end by any suitable means, such for example as a bolt 70. The interior surfaces of the bars 67 and 68 are nicked crosswise as indicated at 71 at the centre of the oscillator so as to position the oscillator on the electromotor shaft 33'.

The clamping action of the bars 67 and 68 drawn together by the bolt 70 holds the oscillator in position on the shaft. The resiliency of these bars is high and the clamping pressure sufficient to give the desired positive attachment. The advantage of this form of oscillator is that by clasping the armatures 47 and 48 between the palm and fingers of the hand, sufficient pressure can be readily exerted to spring the arms 67 and 68 to release them from shaft 33'. This motion brings the ends 63 of armature 47' close to, or into contact with, the corresponding end of armature 48'. The normal gap between these ends, however, is small enough so that they act as a stop definitely limiting the motion which can be thus produced so that the oscillator can be made of cast iron without danger of breakage when manipulating it as just described.

In this form of electromotor the oscillator can be so readily assembled upon and removed from shaft 33' that it is not necessary to provide for a means of disconnecting the supporting arm 22' for the semaphore, and this arm is preferably made integral with shaft 33' as shown.

Referring now to the modified form of electromotor of Fig. 11, this form is similar to that shown in Fig. 1, in that it is controlled by an external switch such as a thermostatic switch 50. It is adapted particularly for actuating advertising devices where it is necessary to arrange the electromotor shaft in vertical position instead of horizontally.

The solenoid 21'' is similar to solenoid 21 and similarly mounted. Only a single armature 72 is employed and the restoring force is produced by means of a spiral spring 73 instead of by gravity as in the other forms of electromotor. The manner in which these parts are associated however, is such as to impart a particular and somewhat different motion to the animated element of the display.

The animated element is mounted upon an arm 74 similar to arm 22. This arm is mounted upon a vertical shaft 75 which is similar to shaft 33 but is mounted in vertical position in a bearing bushing 76 which is in turn fixed in an aperture in a horizontal portion 77 of the display device. On the lower end of bushing 76 the inner end of spring 73 is fixedly secured as for example by means of a nut 78. The outer end of spring 73 is fixed to a radial bar 79 which is fixed to the lower end of shaft 75 to turn the same. The movement of the shaft is thereby dependent upon the motion imparted to the outer end of spring 73. A second bar 80 projects from a hub 81 which is loosely mounted on the outer end of shaft 75, and below this bar is a collar 82 secured upon shaft 75 by means of a set screw 83 so as to retain hub 81 upon the shaft.

The armature 72 is secured firmly to the outer end of bar 80, which serves as its support, and a finger 84 projects upwardly from bar 80 and is secured to one of the inner turns of spiral spring 73. When armature 72 is drawn into coil 21'', motion is thereby imparted to the inner coil of the spring to which finger 84 is attached. This causes a movement of the outer convolutions of the spring and consequently of bar 79 and shaft 75. The rotation of shaft 75 will be greater, however, than the rotation of armature 72, and, moreover, as the armature 72 oscillates under the influence of the solenoid and the inner portion of the spring, the motion of the shaft 75 and the animated element actuated thereby will be modified by the resilient connection between bar 80 and bar 79 consisting of the outer portion of spiral spring 73.

Our improved electromotor has proved itself to be extremely practicable for use in actuating advertising devices and for operation on either alternating or direct current. In operating such a device upon alternating current it is difficult to prevent a chattering or hum which is caused by the influence of the varying current on the various parts of the mechanism. The use of the ring type armature threaded through the centre of the solenoid and arranged with sufficient clearance so that the solenoid and armature do not touch one another has entirely done away with any noticeable sound.

It is to be understood that the above is a mere exemplifying disclosure of several embodiments of our invention, and that the construction of the electromotor may be varied within the scope of the appended claims without departing from the invention.

We claim:

1. An electromotor comprising a solenoid, an oscillator, means for supporting said oscillator within the influence of the solenoid to permit oscillation of the oscillator about its centre, a thermostatically actuated switch for intermittently opening and closing the circuit through the solenoid, and means for restoring the oscillator to its original position after each movement thereof by the solenoid, the period of operation of said switch differing slightly from the natural period of oscillation of the oscillator so as to cause successive swings of the oscillator to differ slightly from each other and produce a slowly recurring sequence of oscillations.

2. In an electromotor, a solenoid, an oscillator comprising a pair of substantially semi-circular armatures, means for supporting said oscillator so as to allow said armatures to oscillate freely through said solenoid, means providing a restoring force to withdraw said armature from within the solenoid, and a switch for opening and closing the circuit of the solenoid actuated by said oscillator to maintain the circuit closed during a predetermined portion of the swing of the oscillator on one side of the centre of the swing.

3. An electromotor comprising an oscillator, means for supporting the same, a solenoid having its axis at right angles to and spaced from the axis of oscillation of the oscillator, said oscillator having a substantially ring-shaped armature coacting with the solenoid, means for intermittently opening and closing the circuit of said solenoid to cause movement of the armature in one direction, and means for producing a restoring force to cause movement of the armature in the opposite direction during the periods when the solenoid circuit is open.

4. An electromotor comprising a shaft, a bearing therefore, a support for the bearing, a member pivotally mounted upon said support, a solenoid carried by said member with its axis at right angles to and spaced from the axis of said shaft, an oscillator mounted upon said shaft having a curved armature portion adapted to be drawn into said solenoid, means for intermittently energizing said solenoid to cause the armature to be drawn into the same, and means for restoring the armature to its original position exterior to said solenoid.

5. In an electromotor, a solenoid, an armature, a driven element, a spring for retracting the armature after movement thereof by the solenoid, and a resilient connection between the armature and the driven element whereby the movement of the armature is amplified in the driven element.

6. In an electromotor, a solenoid, an armature, a driven element, a spiral spring, means for operatively connecting the armature to an inner coil of said spiral spring, and means for operatively connecting the driven element to an outer coil of said spiral spring so as to cause the movement imparted thereto to be greater than and a variation of the movement of the armature.

7. In an electromotor, a solenoid, an oscillator therefor, and a shaft for rotatably supporting said oscillator, said oscillator comprising a pair of semi-circular armatures hinged together at one end and each having an arm extending inwardly from said hinge, and means for holding said arms together at their inner ends thus causing said arms to clamp onto said shaft, said arms being sufficiently resilient to permit springing thereof to release them from or apply them to said shaft.

8. In an electromotor, a solenoid, an oscillator comprising a pair of substantially semi-circular armatures joined together at one end and extending into close proximity at their opposite ends, said armatures being adapted to enter the solenoid from opposite sides and means for supporting said oscillators to oscillate freely through said solenoid.

9. In an electromotor, a solenoid, an oscillator comprising a pair of substantially semi-circular tapered armatures, said armatures being adapted to enter the solenoid from opposite sides, means for supporting said oscillator so as to allow said tapered armatures to oscillate freely through said solenoid and means for intermittently opening and closing the circuit through the solenoid.

10. An electromotor comprising a solenoid, an oscillator mounted to freely oscillate through the solenoid, said oscillator of itself seeking a definite angular position relative to the solenoid, counterbalancing means for causing the oscillator to assume a different angular position relative to the solenoid and means for adjusting the positions of the solenoid and oscillator relative to one another.

11. An electromotor comprising an adjustably mounted solenoid, an oscillator mounted to freely oscillate through the solenoid, said oscillator of itself seeking a definite angular position relative to the solenoid, counterbalancing means for causing the oscillator to assume a different angular position relative to the solenoid and means for adjusting the positions of the solenoid and oscillator relative to one another.

12. In an animated advertising device, the combination of a display poster containing a scene having a stationary portion and a movable portion including a display arm, a pivoting support therefor, means for balancing the display arm in the correct angular position to suit the stationary portion of said scene including a pendulum carried by said pivoting support having a sector-shaped armature, the balanced position of said pendulum and armature being dependent on the arrangement of the display arm for the particular scene, means to impart to said display arm an oscillatory movement comprising said pendulum, a solenoid to cooperate with said armature, means for mounting the solenoid on the display poster to suit said balanced position of the armature while permitting the armature to oscillate freely therethrough, and means for intermittently opening and closing the circuit through said solenoid to cause said pendulum and said display arm to oscillate.

13. In an animated advertising device, the combination of a display poster containing a scene having a stationary portion and a movable portion including a display arm, a pivoting support therefor, means for balancing the display arm in the correct angular position to suit the stationary portion of said scene including a pendulum carried by said pivoting support having a sector-shaped substantially semi-circular armature, the balanced position of said pendulum and armature being dependent on the arrangement of the display arm for the particular scene, means to impart to said display arm an oscillatory movement comprising said pendulum, a solenoid to cooperate with said armature, means for mounting the solenoid on the display poster to suit said balanced position of the armature while permitting the armature to oscillate freely therethrough, and means for intermittently opening and closing the circuit through said solenoid to cause said pendulum and said display arm to oscillate.

14. In an animated advertising device, the combination of a display poster containing a scene having a stationary portion and a movable portion including a display arm, a pivoting support therefor, means for balancing the display arm in the correct angular position to suit the stationary portion of said scene including a pendulum and a sector-shaped armature connected to the display arm to provide a freely swinging system, the balanced position of said pendulum and armature being dependent on the arrangement of the display arm for the particular scene, means to impart to said display arm an oscillatory movement comprising a solenoid to cooperate with said pendulum and armature, means for mounting the solenoid on the display poster to suit said balanced position of the armature while permitting the armature to oscillate freely therethrough, and means for intermittently closing and opening the circuit through said solenoid to cause said pendulum and said display arm to oscillate.

ELI E. GREGORY.
HENRY EMERSON COMINGS.